United States Patent
Schumacher et al.

(10) Patent No.: US 6,743,404 B1
(45) Date of Patent: Jun. 1, 2004

(54) METHOD FOR THE CATALYTIC DECOMPOSITION OF $N_2O$

(75) Inventors: Volker Schumacher, Frankenthal (DE); Gert Bürger, Mannheim (DE); Thomas Fetzer, Speyer (DE); Michael Baier, Mannheim (DE); Michael Hesse, Worms (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/674,047
(22) PCT Filed: Apr. 15, 1999
(86) PCT No.: PCT/EP99/02544
§ 371 (c)(1),
(2), (4) Date: Oct. 25, 2000
(87) PCT Pub. No.: WO99/55621
PCT Pub. Date: Nov. 4, 1999

(30) Foreign Application Priority Data

Apr. 27, 1998 (DE) .......................... 198 19 882

(51) Int. Cl.[7] .......................... B01D 53/56; C01B 21/26
(52) U.S. Cl. .......................... 423/239.1; 423/392
(58) Field of Search .......................... 422/171, 173, 422/177, 191, 193, 198, 211; 423/239.1, 392, 393

(56) References Cited

U.S. PATENT DOCUMENTS

| | | | |
|---|---|---|---|
| 4,973,457 A | 11/1990 | Kongshaug et al. | 423/235 |
| 5,200,162 A | 4/1993 | Riley et al. | 423/239 |
| 5,478,549 A | 12/1995 | Koch | 423/403 |
| 5,587,135 A | 12/1996 | Fetzer et al. | 423/239 |
| 5,750,460 A | 5/1998 | Hartweg et al. | 502/342 |
| 5,945,080 A | 8/1999 | Hartweg et al. | 423/239 |

FOREIGN PATENT DOCUMENTS

| | | |
|---|---|---|
| CA | 2152815 | 8/1994 |
| DE | 43 01 470 | 7/1994 |
| DE | 195 33 715 | 3/1997 |
| DE | 198 05 202 | 2/1999 |
| EP | 359 286 | 3/1990 |
| WO | WO 97/10042 | 3/1997 |
| WO | WO 99/07638 | 2/1999 |

OTHER PUBLICATIONS

Ullman's Encyclopedia of Ind. Chem. 5th Ed., vol. A17, pp. 293–339, (undated).
Tsuchida et al. "Reactivity of η–, γ–, and α–$Al_2O_3$ for $CuAl_2O_4$ Formation" Zeitschrift für Physikalische Chemie Neue Folge Bd. 141, (1984) pp. 101–113.

Primary Examiner—Stanley S. Silverman
Assistant Examiner—Maribel Medina
(74) Attorney, Agent, or Firm—Keil & Weinkauf

(57) ABSTRACT

A reactor for the catalytic oxidation of ammonia to form nitrogen oxides which has a noble metal gauze catalyst and a heat exchanger in that order in the direction of flow, a catalyst for the decomposition of $N_2O$ is located between the noble metal gauze catalyst and the heat exchanger and in a process for the catalytic decomposition of $N_2O$ in a gas mixture obtained in the preparation of nitric acid by catalytic oxidation of ammonia, where the $N_2O$ is decomposed catalytically over a catalyst of the decomposition of $N_2O$, the hot gas mixture obtained from the catalytic oxidation of ammonia is brought to contact with the catalyst for the decomposition of $N_2O$ prior to subsequent cooling.

4 Claims, No Drawings

METHOD FOR THE CATALYTIC DECOMPOSITION OF $N_2O$

The present invention relates to a process for the catalytic decomposition of $N_2O$ in a gas mixture obtained in the preparation of nitric acid by catalytic oxidation of ammonia. The invention further relates to a reactor which is suitable for carrying out the process.

In the industrial preparation of nitric acid by the Ostwald process, ammonia is reacted with oxygen over a noble metal catalyst to form oxides of nitrogen which are subsequently absorbed in water. In this process, ammonia and oxygen or air are reacted at from 800 to 955° C. over a catalyst gauze comprising noble metals in a reactor. The catalyst gauze generally comprises platinum and rhodium as active metals. In the catalytic reaction, ammonia is firstly oxidized to nitrogen monoxide which is subsequently further oxidized by oxygen to give nitrogen dioxide or dinitrogen tetroxide. The gas mixture obtained is cooled and then passed to an absorption tower in which nitrogen dioxide is absorbed in water and converted into nitric acid. The reactor for the catalytic combustion of ammonia also contains, downstream of the catalyst gauze, a recovery gauze for depositing and thus recovering catalyst metals which have been vaporized at the high reaction temperatures. A heat exchanger is located downstream of the recovery gauze to cool the gas mixture obtained. Absorption is carried out outside the actual reactor in a separate absorption column.

The combustion and the absorption can be carried out at the same pressure level. It is possible to employ an intermediate pressure of from about 230 to 600 kPa or a high pressure of from about 700 to 1100 kPa. In the case of a process with two pressure stages, the absorption is carried out at a higher pressure than the combustion. The pressure in the combustion is then from about 400 to 600 kPa and the pressure in the absorption is from about 900 to 1400 kPa.

An overview of the Ostwald process may be found, for example, in Ullmann's Encyclopedia of Industrial Chemistry, 5th edition, Volume A 17, pages 293 to 339 (1991).

The combustion of ammonia forms not only nitrogen monoxide and nitrogen dioxide or dinitrogen tetroxide but generally also $N_2O$ (dinitrogen monoxide) as by-product. In contrast to the other oxides of nitrogen formed, $N_2O$ is not absorbed by the water during the absorption step. If no further step for removing $N_2O$ is provided, $N_2O$ can be emitted into the environment in a concentration of from about 500 to 3000 ppm in the waste gas.

Since $N_2O$ is a greenhouse gas and participates in the depletion of the ozone layer, very substantial removal from the waste gas is desirable. A number of methods of removing $N_2O$ from waste gas streams have been described.

DE-A-195 33 715 describes a process for removing nitrogen oxides from a gas stream, in which the nitrogen oxides apart from $N_2O$ are absorbed in an absorption medium and remaining $N_2O$ is subsequently decomposed catalytically at from 700 to 800° C. in a decomposition reactor. Since nitrogen oxides can be formed in this decomposition, a selective catalytic reduction (SCR) can follow.

U.S. Pat. No. 5,478,549 describes a process for preparing nitric acid by the Ostwald method, in which the $N_2O$ content is reduced by passing the gas stream after the oxidation over a catalyst bed of zirconium oxide at a temperature of at least 600° C. However, the precise position of the catalyst bed is not indicated. It is only stated that zirconium oxide in the form of cylindrical pellets is located below the recovery gauze. The space velocity in the reactor is 30,000 h⁻ at 4 bar and 600° C.

EP-B 0 359 286 describes a process for the reduction of $N_2O$. For this purpose, a reactor for carrying out the Ostwald process is modified in such a way that the gases obtained after the catalytic combustion are subjected to a retention time of from 0.1 to 3 seconds before cooling by means of the heat exchanger. If desired, a catalyst for the selective decomposition of $N_2O$ can be additionally provided.

It is an object of the present invention to provide a process and an apparatus for preparing nitric acid by the Ostwald method, by means of which the $N_2O$ content of the waste gases can be reduced very effectively and at low cost. The process should also be able to be integrated into existing plants and preferably increase the proportion of useful product. In addition, additional heating and cooling steps for the waste gas should be avoided, so that the removal of $N_2O$ can be carried out economically.

We have found that this object is achieved by a reactor for the catalytic oxidation of ammonia to nitrogen oxides, which contains a noble metal gauze catalyst and a heat exchanger in that order in the direction of flow and has a catalyst for the decomposition of $N_2O$ located between the noble metal gauze catalyst and the heat exchanger.

The object is also achieved by a process for the catalytic decomposition of $N_2O$ in a gas mixture obtained in the preparation of nitric acid by catalytic oxidation of ammonia, where the $N_2O$ is decomposed catalytically over a catalyst for the decomposition of $N_2O$, wherein the hot gas mixture obtained from the catalytic oxidation of ammonia is brought into contact with the catalyst for the decomposition of $N_2O$ prior to subsequent cooling.

According to the present invention, it has been found that $N_2O$ can be reacted directly in the reactor for the catalytic oxidation of ammonia when a suitable catalyst is located between the noble metal gauze catalyst and the heat exchanger. In this way, $N_2O$ formed as by-product is decomposed immediately after it is formed. The decomposition occurs at the temperature prevailing in the catalytic oxidation of ammonia. Heating or cooling of the gaseous reaction mixture is thus unnecessary. The catalyst for the decomposition of $N_2O$ which is used according to the present invention is located directly in the reactor, preferably between the position of a noble metal recovery gauze located downstream of the noble metal catalyst and the position of the heat exchanger. Reactors for the Ostwald process are usually provided with inserts for accommodating the noble metal catalyst and the noble metal recovery gauze. These reactors can easily be modified by additionally providing a holder for the $N_2O$ decomposition catalyst.

The low catalyst bed height required according to the present invention allows installation in existing reactors without great rebuilding of the reactors. Thus, existing reactors can be modified to enable the process of the present invention to be carried out, without replacement of the reactor being necessary. The Ostwald process can be carried out at one pressure level or at two pressure levels, as described above. The height of the catalyst bed is preferably from 2 to 50 cm, particularly preferably from 5 to 10 cm. In production, the residence time over the catalyst is preferably less than 0.1 s. The pressure drop caused by installation of the catalyst is therefore very low, a small amount of catalyst can be employed, and the gas has to be held at a high temperature level for only a short time after the oxidation, so that secondary reactions can largely be suppressed.

According to the present invention, the decomposition of $N_2O$ is carried out in the reactor for the oxidation of ammonia at the oxidation temperature, generally at a temperature in the range from 600 to 950° C., preferably from 800 to 930° C., in particular from 850 to 920° C. The pressure is, depending on the pressure level at which the Ostwald process is carried out, generally from 1 to 15 bar.

As noble metal gauze catalyst, it is possible to use any noble metal gauze catalyst suitable for the catalytic oxidation of ammonia. The catalyst preferably comprises platinum and possibly rhodium and/or palladium as catalytically active metals.

The noble metal recovery gauze is preferably made of palladium. The catalyst used according to the present invention for the decomposition of $N_2O$ is preferably selected from among catalysts which still have sufficient activity at above 900° C. to decompose $N_2O$ at this temperature in the presence of NO and/or $NO_2$. Catalysts which are suitable for the purposes of the present invention are, for example, binary oxides such as MgO, NiO, ZnO, $Cr_2O_3$, $TiO_2$, $WO_x$, SrO, $CuO/Cu_2O$, $Al_2O_3$, $Se_2O_3$, $MnO_2$ or $V_2O_5$, if desired doped with metal oxides, lanthanide complexes such as $La_2NiO_4$, $La_2CuO_4$, $Nd_2CuO_4$ and multinary oxide compounds thereof, spinels, ternary perovskites, and also oxidic systems such as $CuO$—$ZuO$—$Al_2O_3CoO$—$MgO$, $CoO$—$La_2O_3$, $CO$—$ZuO$, $NiO$—$MoO_3$ or metals such as Ni, Pd, Pt, Cu, Ag. Preference is given to using a catalyst as described in DE-A-43 01 470.

Such a catalyst can be prepared, for example, by combining $CuAl_2O_4$ with tin, lead and/or an element of main group II or transition group II of the Periodic Table of the Elements as oxide or salt or in elemental form, and subsequently calcining the mixture at from 300 to 1300° C. and a pressure in the range from 0.1 to 200 bar. The catalyst can have any suitable shape. It is preferably used in extrudate form, in particular in the form of star extrudates. The preferred diameter of the extrudates is from 2 to 10 mm, particularly preferably from 3 to 6 mm. The catalyst can also be used in other forms, particularly also in the form of a honeycomb catalyst.

The catalyst is preferably prepared using zinc, magnesium, calcium, strontium and/or barium as oxide or salt or in elemental form in addition to $CuAl_2O_4$. The catalyst is preferably free of noble metals.

To prepare the catalyst, use is made of $CuAl_2O_4$ of which from 1 to 100% by weight, preferably from 10 to 100% by weight, particularly preferably from 80 to 100% by weight, is present as spinel. It is particularly preferably completely in the form of spinel. Mixing with tin, lead and/or an element of main group II or transition group II of the Periodic Table of the Elements is preferably carried out at from 500 to 1200° C., particularly preferably from 600 to 1100° C., and preferably at pressures of from 0.5 to 10 bar, particularly preferably at atmospheric pressure. Mixing can be carried out, for example, by spraying, mechanical mixing, stirring or kneading of the milled solid of the composition $CuAl_2O_4$. Particular preference is given to impregnation of the unmilled solid. During the calcination after the mixing with the additive, the copper is preferably replaced at least partly by the additional metal. The finished catalyst preferably comprises at least 70%, particularly preferably at least 80%, in particular at least 90%, of a spinel phase.

As elements of main group II or transition group II of the Periodic Table of the Elements, it is possible to use not only oxides and the elements in metallic form but also their salts. Examples are carbonates, hydroxides, carboxylates, halides and oxidic anions such as nitrites, nitrates, sulfides, sulfates, phosphites, phosphates, pyrophosphates, halites, halates and basic carbonates. Preference is given to carbonates, hydroxides, carboxylates, nitrites, nitrates, sulfates, phosphates and basic carbonates, particularly preferably carbonates, hydroxides, basic carbonates and nitrates. The additional metal is particularly preferably in the oxidation state +2. Preference is given to using Zn, Mg, Ca, Sr and/or Ba, in particular Zn and/or Mg.

The preparation of the starting oxide of the composition $CuAl_2O_4$, preferably in the form of a spinel, is known from, for example, Z. Phys. Chem., 141 (1984), pages 101 to 103. Preference is given to impregnating an $Al_2O_3$ support with a solution of an appropriate salt. The anion is then preferably decomposed thermally to form the oxide. It is also possible to mix the salt with the aluminum compound (for example in suspension with subsequent spray drying), compact it and then bring it into the desired shape, followed by calcination.

The catalyst preferably comprises from 0.1 to 30% by weight of CuO, from 0.1 to 40% by weight of the further metal oxide, in particular ZnO, and from 50 to 80% by weight of $Al_2O_3$.

The catalyst is particularly preferably made up of about 8% by weight of CuO, 30% by weight of ZnO and 62% by weight of $Al_2O_3$. Apart from the spinel, preferably small amounts of CuO and further metal oxide are also present. Preferably, not more than 3.5% by weight of CuO and not more than 10% by weight of ZnO are present.

Suitable catalysts are also described in DE-A-43 01 469 and EP-A-0 687 499. Further examples of preparations of catalysts which can be used according to the present invention may be taken from the documents cited.

The catalyst preferably has a BET surface area of from 1 to 350 $m^2/g$. The porosity is preferably in the range from 0.01 to 0.8 l/g.

In the reactor of the present invention, the catalyst is preferably used in the star extrudate form described as a fixed bed. The thickness of the fixed bed is preferably from 2 to 50 cm, particularly preferably from 5 to 10 cm. The residence time over the catalyst for the decomposition of $N_2O$ is preferably less than 0.1 s.

The use of the catalyst directly in the reactor for the catalytic oxidation of ammonia leads to complete degradation of $N_2O$, with nitrogen oxides being formed. The nitrogen oxides formed in the oxidation of ammonia are not degraded over this catalyst. The catalyst has a high activity. As a result of the low height of the catalyst bed and the preferred star extrudate shape of the catalyst, only a small pressure drop occurs in the reactor. No additional heating or cooling is required for the removal of $N_2O$. Since the reactors are built for accommodating catalyst gauzes, rebuilding of a nitric acid plant is generally not necessary.

The invention is illustrated by the examples below.

EXAMPLE 1

In a laboratory apparatus, ammonia in an ammonia/air mixture having a concentration of 12.5% by volume of ammonia and 87.5% by volume of air was reacted over a Pt/Rh gauze at 913° C. and a throughput of 37 g/h of ammonia per $cm^3$ of gauze area to form nitrogen monoxide. Immediately downstream of the platinum gauze, there was a 10 cm high bed of the above-described preferred catalyst consisting of 8% by weight of CuO, 30% by weight of ZnO and 62% by weight of $Al_2O_3$; the reaction gas flowed through this bed at 750° C. with a residence time of 0.03 s. Upstream of the catalyst bed, the $N_2O$ concentration was 685 ppm, while only 108 ppm were present downstream of the catalyst bed. The content of nitrogen monoxide remained unchanged before and after the catalyst bed.

EXAMPLE 2

In an atmospheric pressure reactor for the catalytic oxidation of ammonia to nitrogen oxides, which was equipped with a platinum/rhodium gauze as catalyst and a palladium gauze for noble metal recovery and a heat exchanger, a fixed catalyst bed having a thickness of 9 cm was installed between the recovery gauze and the heat exchanger. The catalyst bed comprised the above-described preferred catalyst consisting of 8% by weight of CuO, 30% by weight of ZnO and 62% by weight of $Al_2O_3$. The catalyst was used as star extrudates having a diameter of 4 mm. The reactor was supplied with a mixture of 12.1% by volume of ammonia and 87.9% by volume of air; the gas throughput corresponded to 15,000 kg/day of $HNO_3$ per $m^3$ of noble metal gauze. The temperature in the reactor was 860° C. The residence time over the $N_2O$ decomposition catalyst described was less than 0.05 s. The concentration of $N_2O$ at the outlet of the reactor was 120 ppm.

In a comparative measurement, the additional catalyst bed for the decomposition of $N_2O$ was omitted. An $N_2O$ concentration at the reactor outlet of 606 ppm was obtained.

The measured $NO_x$ concentration was in both cases 11.28% by volume.

We claim:

1. A process for the catalytic decomposition of $N_2O$ in a gas mixture obtained in the preparation of nitric acid by catalytic oxidation of ammonia, where the $N_2O$ is decomposed catalytically over a catalyst for the decomposition of $N_2O$, wherein the hot gas mixture obtained from the catalytic oxidation of ammonia is brought into contact with the catalyst for the decomposition of $N_2O$ prior to subsequent cooling, wherein the residence time over the catalyst for the decomposition of $N_2O$ is less than 0.05 s wherein the process is carried out in a reactor which contains a noble metal gauze catalyst and a heat exchanger in that order in the direction of flow and the catalyst for the decomposition of $N_2O$ is located between the noble metal gauze catalyst and the heat exchanger, wherein the catalyst for the decomposition of $N_2O$ is installed as a fixed bed having a height of from 5–10 cm.

2. A process as claimed in claim 1, wherein the decomposition of $N_2O$ is carried out at from 600 to 950° C. and/or at a pressure in the range from 1 to 15 bar.

3. A process as claimed in claim 1, wherein the catalyst for the decomposition of $N_2O$ is prepared by combining $CuAl_2O_4$ with tin, lead and/or an element of main group II or transition group II of the Periodic Table of the Elements as oxide or salt or in elemental form and subsequently calcining the mixture at from 300 to 1300° C. and a pressure in the range from 0.1 to 200 bar.

4. The process of claim 1, wherein the residence time over the catalyst for the decomposition of $N_2O$ is 0.03 s.

* * * * *